(12) United States Patent
Chang et al.

(10) Patent No.: US 12,496,983 B2
(45) Date of Patent: Dec. 16, 2025

(54) SCREEN BRACKET AND VEHICLE-MOUNTED ROTATING SCREEN

(71) Applicants:Futaijing Precision Electronics (Yantai) Co., Ltd., Yantai (CN); HON HAI PRECISION INDUSTRY CO., LTD., New Taipei (TW)

(72) Inventors: Yu-Sheng Chang, New Taipei (TW); Chi-Cheng Wen, New Taipei (TW); Wen-Bin Huang, New Taipei (TW); Hsiu-Fu Li, New Taipei (TW); Yu-Chih Cheng, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 229 days.

(21) Appl. No.: 18/512,934

(22) Filed: Nov. 17, 2023

(65) Prior Publication Data

US 2025/0091524 A1 Mar. 20, 2025

(30) Foreign Application Priority Data

Sep. 20, 2023 (CN) .......................... 202322560578.X

(51) Int. Cl.
*B60R 11/02* (2006.01)
*B60R 11/00* (2006.01)

(52) U.S. Cl.
CPC ... *B60R 11/0235* (2013.01); *B60R 2011/0084* (2013.01); *B60R 2011/0085* (2013.01)

(58) Field of Classification Search
CPC ........ B60K 2360/685; B60K 2360/774; B60K 2360/834; B60K 35/23; B60K 35/81; B60R 11/02; B60R 11/0235; B60R 2011/0084; B60R 2011/008; B60R 2011/0082; B60R 2011/0092; B60R 2011/0085; B60R 2011/0087; B60R 2011/0089; B60R 2011/0091
USPC ................................................ 348/148, 837
See application file for complete search history.

(56) References Cited

U.S. PATENT DOCUMENTS

| | | | |
|---|---|---|---|
| 7,963,488 B2* | 6/2011 | Hasegawa ............ | F16M 11/105 248/920 |
| 11,427,135 B2* | 8/2022 | Luo ........................ | B60K 35/60 |
| 11,661,017 B2* | 5/2023 | Bai ......................... | F16H 57/02 248/479 |

FOREIGN PATENT DOCUMENTS

WO WO-2019154225 A1 * 8/2019 ............. B60R 11/02

* cited by examiner

*Primary Examiner* — Nathnael Aynalem
(74) *Attorney, Agent, or Firm* — ScienBiziP, P.C.

(57) ABSTRACT

Disclosed in the present disclosure is a screen bracket and a vehicle-mounted rotating screen. The screen bracket includes a rotating base, a connecting shaft, and a limiting member. A first end of the connecting shaft is connected to a display screen, a second end of the connecting shaft rotatably connected to the rotating base, the second end of the connecting shaft defines a plurality of locating holes. The limiting member is fixed to the rotating base, the limiting member has a telescopic rod, and the telescopic rod is disposed towards the connecting shaft. When the connecting shaft rotates to a specified rotation angle, a corresponding locating hole is facing the telescopic rod, and the telescopic rod is configured to clamp the corresponding locating hole in an extended state and detach the corresponding locating hole in a retracted state.

16 Claims, 7 Drawing Sheets

SCREEN BRACKET AND VEHICLE-MOUNTED ROTATING SCREEN

FIELD

The present disclosure relates to the technical field of vehicle-mounted screen, in particular to a screen bracket and a vehicle-mounted rotating screen.

BACKGROUND

Smart vehicles are usually equipped with vehicle-mounted rotating screens, which can be controlled by the user to rotate the display screen to a specified angle, for example, staying at 90° (vertical screen state) or 180° (horizontal screen state) and displaying corresponding content to meet the user's need to observe the display content from different angles. In the related art, a vehicle-mounted rotating screen includes a display screen, a screen bracket, and a rotating motor. The screen bracket includes a connecting shaft and a rotating seat, the connecting shaft is fixedly connected to the display screen, and the connecting shaft is rotationally connected to the rotating seat. The rotating seat is fixed to the center console of the vehicle, the rotating motor is set in the rotating seat, an output shaft of the rotating motor is connected to the connecting shaft through a transmission structure so that the rotating motor can drive the connecting shaft to rotate and realize the rotation of the display screen.

However, when the vehicle-mounted rotating screen is subjected to external forces, such as in the case of improper use by a user who manually rotates the display screen, it is easy to cause the rotating motor and transmission structure in the vehicle-mounted rotating screen to be easily damaged, affecting the durability of the vehicle-mounted rotating screen.

Therefore, improvement is desired.

DETAILED DESCRIPTION

The technical solutions in the embodiments of the present disclosure will be described below in conjunction with the accompanying drawings in the embodiments of the present disclosure, and it is clear that the embodiments described are only a portion of the embodiments of the present disclosure and not all of them.

In the description of the embodiments of the present disclosure, the technical terms "first," "second," and the like are only used to distinguish different objects, and are not to be construed as indicating or implying relative importance, or implicitly specifying the number, specific order, or primary-secondary relationship of the indicated technical features. In the description of the embodiments of the present disclosure, "more than one" means more than two, unless otherwise expressly and specifically limited.

It should be noted that when an element is considered to be "connected" to another element, it may be directly connected to the other element or there may be both centered elements. When an element is considered to be "disposed on" another element, it may be disposed directly on the other element or there may be both centered elements.

In the present disclosure, unless otherwise expressly provided and limited, the terms "connection," "fixing," and the like shall be broadly construed, for example, the fixing connection may be snap-fit fixing, bolt-fit fixing or one-piece molding and the like. To a person of ordinary skill in the art, the specific meaning of the above terms in the present disclosure may be understood according to the specific circumstances.

Embodiments of the present disclosure are further described below in conjunction with the accompanying drawings.

Figure 1:
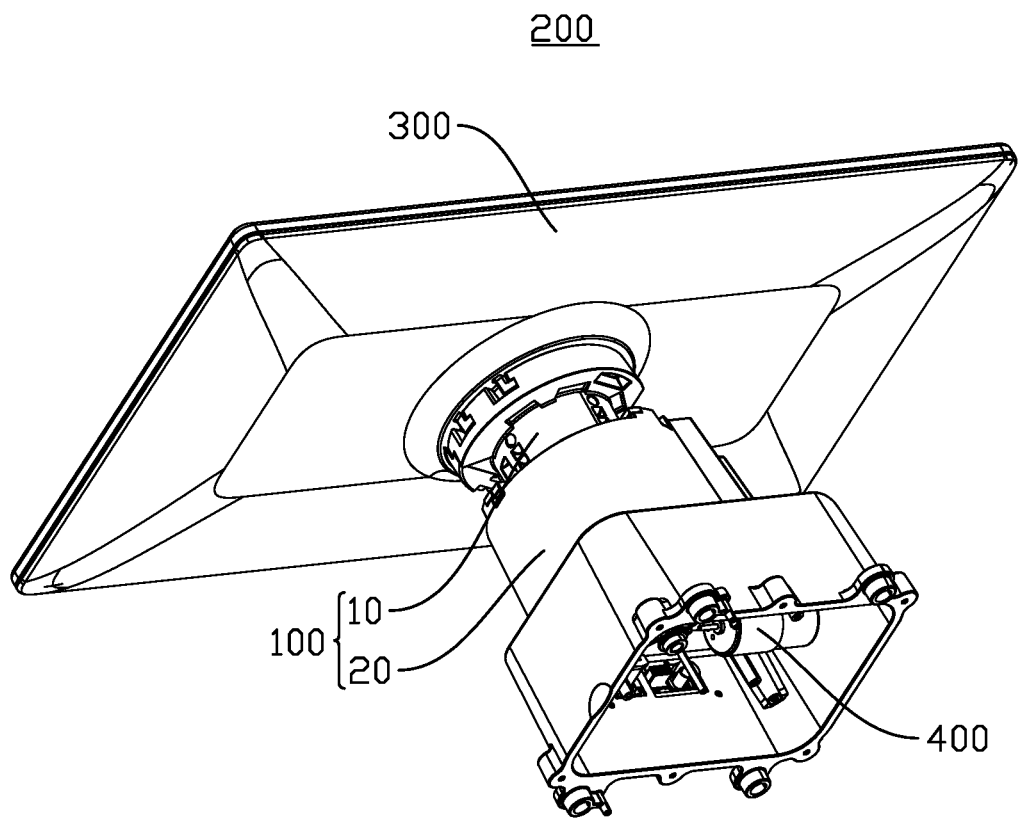
FIG. 1 is a schematic diagram illustrating a vehicle-mounted rotating screen according to an embodiment of the present disclosure.

FIG. 1 illustrates a screen bracket 100 in accordance with an embodiment of the present disclosure.

The screen bracket 100 may be applied to a vehicle-mounted rotating screen 200.

The screen bracket 100 can work with a display screen 300 and a driving device 400, the screen bracket 100 is used to support and fix the display screen 300 and the driving device 400, and the driving device 400 is used to drive the display screen 300 to rotate.

Figure 2:
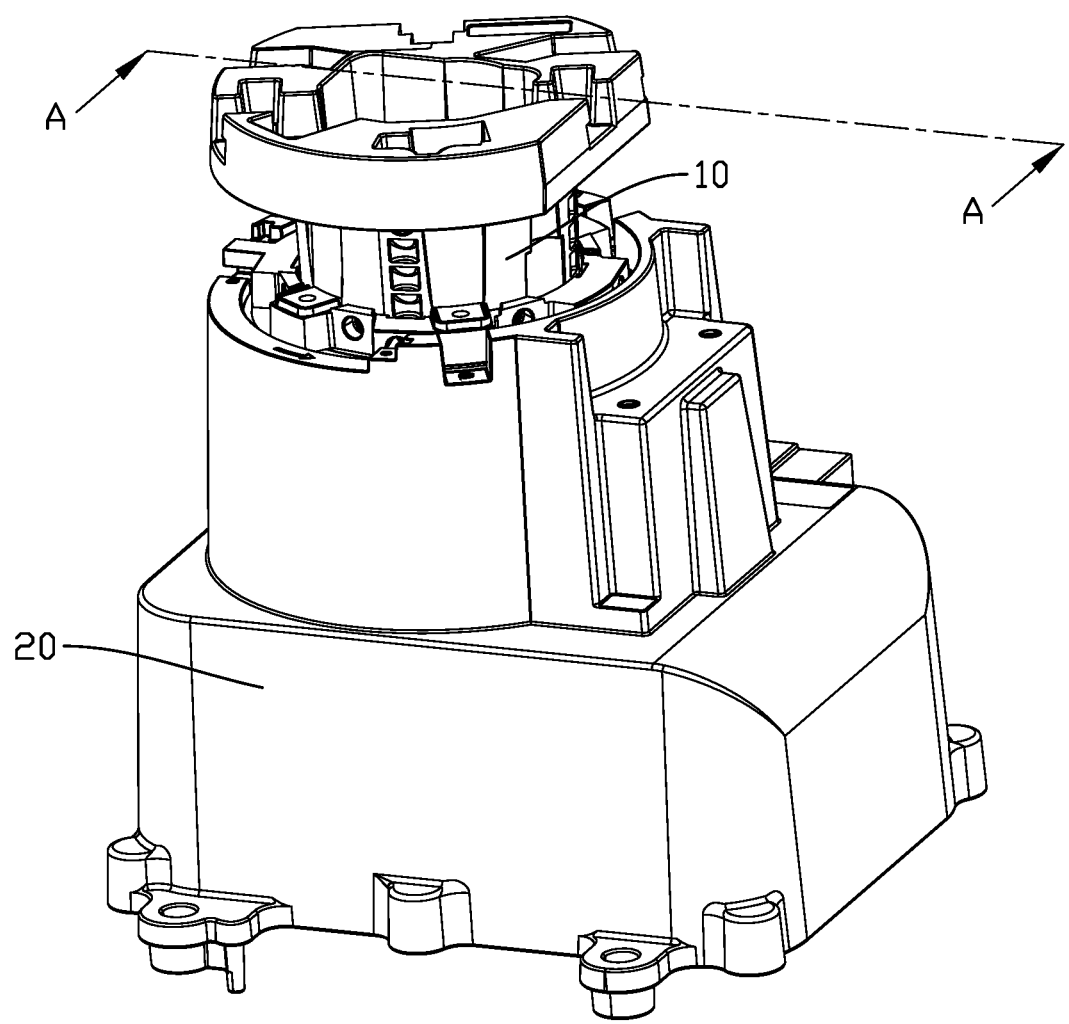
FIG. 2 is a schematic diagram illustrating a screen bracket according to an embodiment of the present disclosure.
Figure 3:
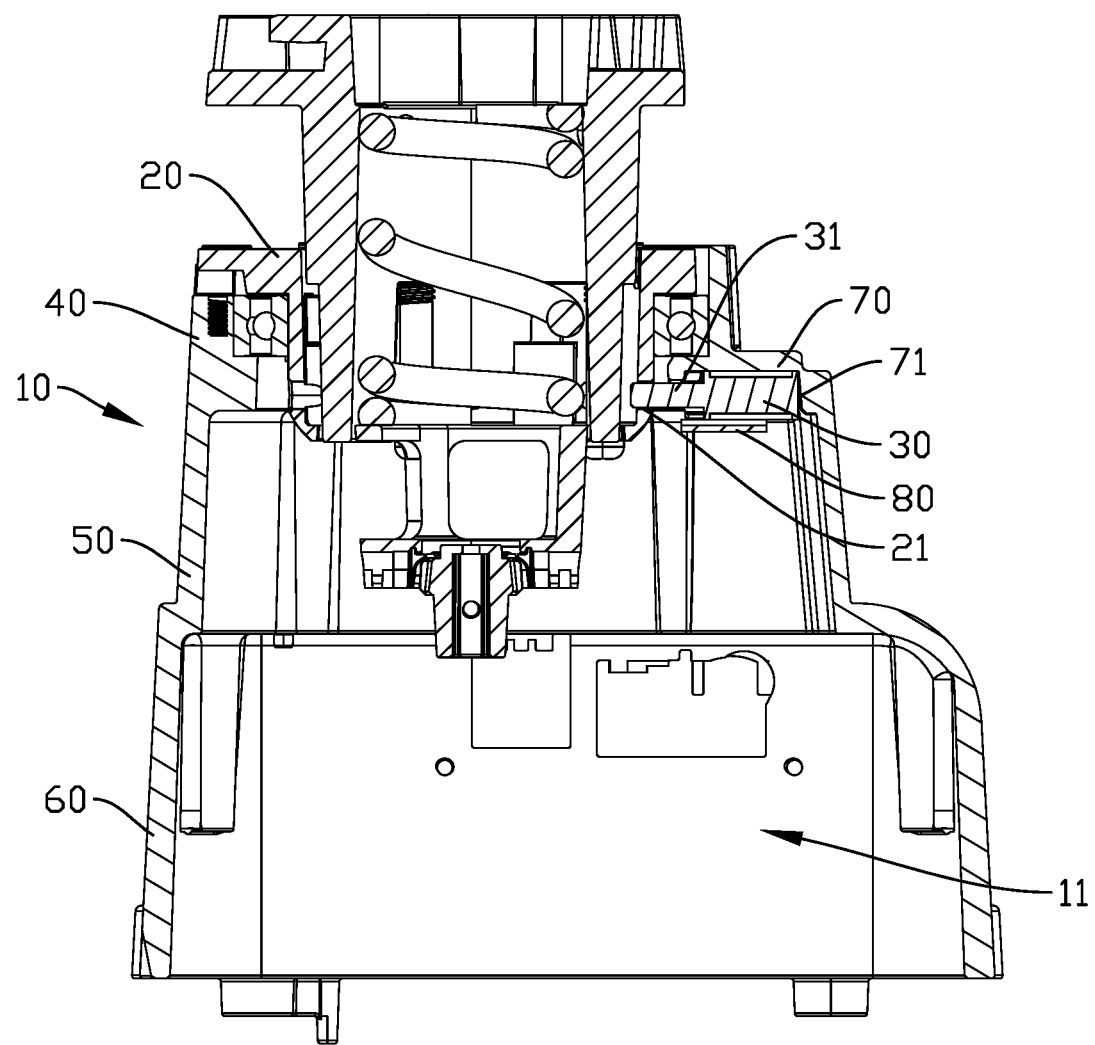
FIG. 3 is a cross-sectional view illustrating a section along line A-A in FIG. 2.

As shown in FIGS. 2 and 3, the screen bracket 100 includes a rotating base 10, a connecting shaft 20 and a limiting member 30. One end of the connecting shaft 20 is connected to the display screen 300, and another end of the connecting shaft 20 is rotatably connected to the rotating base 10. The limiting member 30 is fixedly disposed in the rotating base 10, and the limiting member 30 is located on one side of the connecting shaft 20.

The driving device 400 is disposed in the rotating base 10, and the driving device 400 is connected to the connecting shaft 20. The driving device 400 is used to drive the connecting shaft 20 to rotate, and the limiting member 30 is used to maintain the connecting shaft 20 at a specified rotation angle.

Referring to FIGS. 1 and 3, the rotating base 10 may be fixed to the center console of the vehicle, and the driving device 400 drives the connecting shaft 20 to rotate in response to the control of an electrical signal, so as to drive the display screen 300 to rotate to a specified rotating angle, for example, the display screen 300 may rotate to 90° and 180°. When the display screen 300 is rotated to 90°, the display screen 300 is in a vertical screen mode. When the display screen 300 is rotated to 180°, the display screen 300 is in a horizontal screen mode. When the rotation of the display screen 300 is complete, the limiting member 30 may position the display screen 300 at the current rotation angle.

Figure 4:
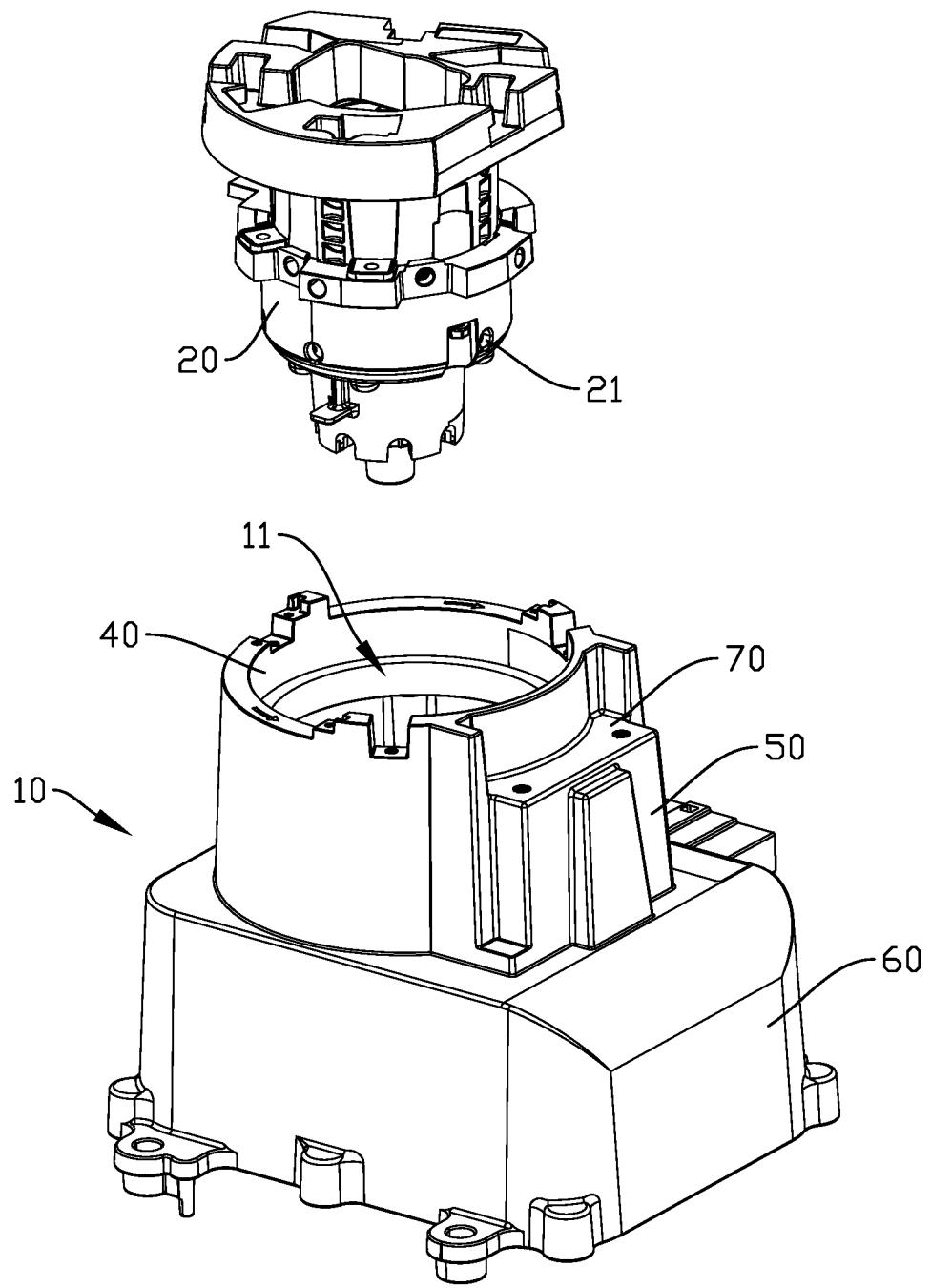
FIG. 4 is an exploded view illustrating a connecting shaft and a rotating base according to an embodiment of the present disclosure.

Referring to FIGS. 3 and 4, an end of the connecting shaft 20 proximate to the rotating seat rotating base 10 may define a plurality of locating holes 21, the plurality of the locating holes 21 are spaced apart around a circumference of the connecting shaft 20, and the locating hole 21 runs radially through the connecting shaft 20 along the rotation direction of the connecting shaft 20. When the connecting shaft 20 is rotated, the plurality of the locating holes 21 are moved in a circular motion at the same time.

The limiting member 30 includes a telescopic rod 31, the telescopic rod 31 has an extended state and a retracted state, and the limiting member 30 can change the telescopic state of the telescopic rod 31 under the control of an electric signal. The telescopic rod 31 is disposed toward the connecting shaft 20, and the telescopic direction of the telescopic rod 31 corresponds to the rotation radial direction of the connecting shaft 20.

When the telescopic rod 31 is switched from the retracted state to the extended state, the telescopic rod 31 as a whole moves in a direction close to the connecting shaft 20. When the telescopic rod 31 is switched from the extended state to the retracted state, the telescopic rod 31 as a whole moves in a direction away from the connecting shaft 20.

The telescopic rod 31 is provided corresponding to the plurality of the locating holes 21, and the internal shape of the locating hole 21 matches the shape of the end of the telescopic rod 31. The plurality of the locating holes 21 correspond to different rotation angles, and when the connecting shaft 20 is rotated to a specified rotation angle, the locating hole 21 corresponding to that rotation angle are facing the telescopic rod 31.

In the embodiment, the number of the locating holes 21 is 2, and the connecting shaft 20 can be rotated at angles of 90° and 180°. When the connecting shaft 20 is rotated to 90°, one locating hole 21 is facing the telescopic rod 31, and when the connecting shaft 20 is rotated to 180°, another locating hole 21 is facing the telescopic rod 31. The number of the locating holes 21 and the rotatable angle of the connecting shaft 20 can be set according to product requirements and can be adjusted in practical applications.

In the embodiment, when the telescopic rod 31 is in the extended state, the telescopic rod 31 may extend into the opposite locating hole 21 and clamp into the corresponding locating hole 21, and the limiting member 30 prevents the connecting shaft 20 from rotating. When the telescopic rod 31 is in the retracted state, the telescopic rod 31 can extend out of the opposite locating hole 21 and detach from the corresponding locating hole 21, and the limiting member 30 does not interfere with the rotation of the connecting shaft 20.

Referring to FIGS. 1 and 3, in the embodiment, the process by which the rotation of the display screen 300 occurs is as follows:

Firstly, the telescopic rod 31 is made in the retracted state.

With the telescopic rod 31 in the retracted state, the driving device 400 rotates the connecting shaft 20 to a specified angle of rotation, for example, the display screen 300 rotates to 90° or 180°.

After the rotation of the connecting shaft 20 is completed, the telescopic rod 31 is switched to the extended state, and the rod telescopic rod 31 is clamped to the corresponding locating hole 21.

When the display screen 300 needs to rotate, the telescopic rod 31 can be far away from the locating hole 21. When the display screen 300 does not need to rotate, the telescopic rod 31 can be clamped and matched with the corresponding locating hole 21 to limit the rotation angle of the connecting shaft 20, thereby preventing the display screen 300 from rotating under external forces (such as when the user manually rotates the display screen 300 due to improper use), this can reduce the risk of damage to the driving device 400 or related connection structures and improve durability.

In an embodiment of the present disclosure, the limiting member 30 is a solenoid valve, specifically a valve needle type solenoid valve, the solenoid valve has a retractable valve needle, and the telescopic rod 31 is the valve needle of the solenoid valve. When the solenoid valve is energized, the valve needle is retracted into the solenoid valve, and the telescopic rod 31 is in a retracted state. When the solenoid valve is not energized, the valve needle extends out of the solenoid valve, and the telescopic rod 31 is in an extended state.

The solenoid valve is also electrically connected to a wire, and the wire is electrically connected to a control motherboard, and the control motherboard can control the energized state and de-energized state of the solenoid valve according to preset circuits and programs so as to change the telescopic state of the telescopic rod 31.

In other embodiments, the limiting member 30 may also be a motor-driven device. For example, the limiting member 30 may include a housing, a telescopic rod 31, a motor, and a transmission mechanism. The motor and the transmission mechanism are provided in the housing, the telescopic rod 31 is threaded and slidably provided in the housing, one end of the telescopic rod 31 is exposed to the housing, and another end of the telescopic rod 31 is located in the housing and is connected to the output shaft of the motor by the transmission mechanism. The transmission mechanism can be a rack and pinion mechanism or a screw driving mechanism. The motor is electrically connected to the control motherboard via a wire. The motor may respond to an electrical signal from the control motherboard to drive the output shaft to rotate, thereby driving the telescopic rod 31 to slide, and thereby changing the telescopic state of the telescopic rod 31.

Referring to FIGS. 3 and 4, in an embodiment of the present disclosure, the rotating base 10 is a hollow housing structure, and a mounting cavity 11 is formed inside the rotating base 10, and the mounting cavity 11 runs through both sides of the rotating base 10. The rotating base 10 is sequentially equipped with a first mounting portion 40, a second mounting portion 50, and a third mounting portion 60 in the axial direction of the connecting shaft 20. The first mounting portion 40, the second mounting portion 50, and the third mounting portion 60 are integrally formed, and a cross-sectional area inside the first mounting portion 40 is less than a cross-sectional area inside the second mounting portion 50, and a cross-sectional area inside the second mounting portion 50 is less than a cross-sectional area inside the third mounting portion 60.

The first mounting portion 40 is disposed in a circular shape as a whole, and the mounting cavity 11 runs through one side of the first mounting portion 40. The connecting shaft 20 can penetrate the first mounting portion 40 and enter the mounting cavity 11. A rotating bearing is disposed between the connecting shaft 20 and the first mounting portion 40 to rotate and connect the connecting shaft 20 with the rotating base 10.

One side of the second mounting portion 50 is flush with the side surface of the first mounting portion 40, and the opposite side of the second mounting portion 50 projects in a direction away from the connecting shaft 20. A fourth mounting portion 70 is formed at the junction between the first mounting portion 40 and the second mounting portion 50, and a stepped mounting area is formed between the first mounting portion 40, the second mounting portion 50, and the fourth mounting portion 70, and the limiting member 30 is secured in this mounting area.

Figure 5:
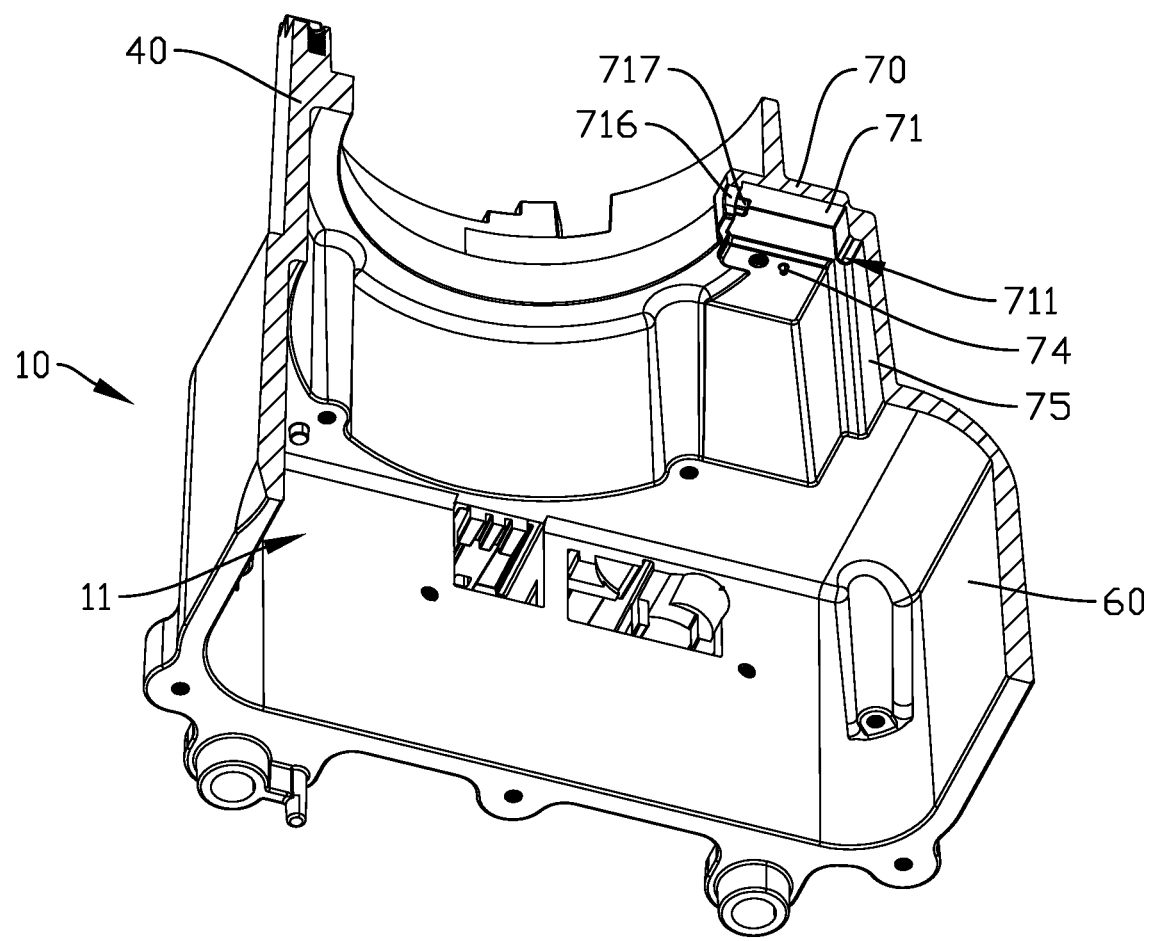
FIG. 5 is a cross-sectional view illustrating the rotating base according to an embodiment of the present disclosure.
Figure 6:
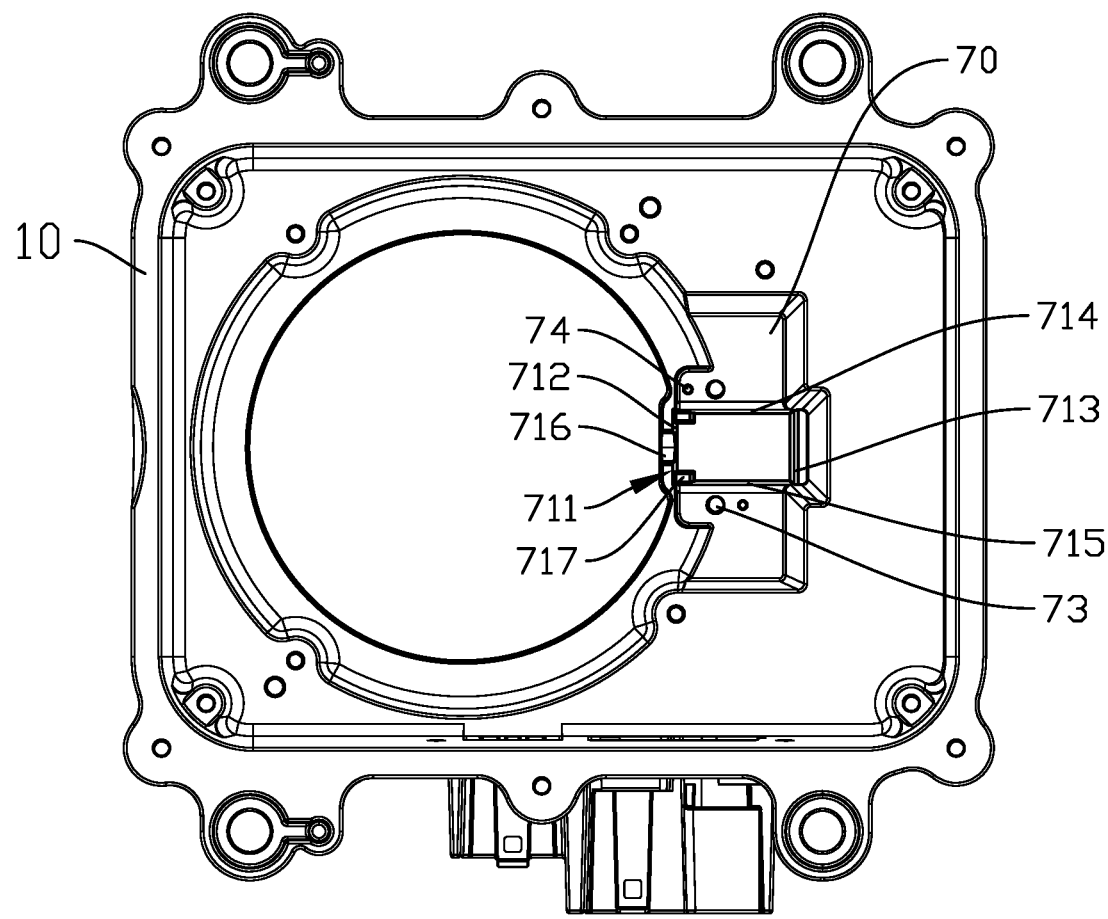
FIG. 6 is a top view illustrating the rotating base according to an embodiment of the present disclosure.

Referring to FIGS. 5 and 6, the fourth mounting portion 70 defines a mounting groove 71, the mounting groove 71 can be formed in a depression on a surface of the fourth mounting portion 70, and a notch 711 of the mounting groove 71 facing the third mounting portion 60. The shape of the mounting groove 71 is rectangular overall, and the mounting groove 71 includes a first groove wall 712, a second groove wall 713, a third groove wall 714, and a fourth groove wall 715. The first groove wall 712 is disposed opposite the second groove wall 713, the third groove wall 714 is disposed opposite the fourth groove wall 715, and the third groove wall 714 and the fourth groove wall 715 are disposed between the first groove wall 712 and the second groove wall 713.

Referring to FIGS. 3 and 5, the first groove wall 712 is a side groove wall of the mounting groove 71 proximate to the connecting shaft 20, the first groove wall 712 is provided with a connecting port 716, and the connecting port 716 passes through the first groove wall 712. The limiting member 30 is disposed in the mounting groove 71, and the telescopic rod 31 is threaded through the connecting port 716 and points towards the connecting shaft 20.

In the embodiment, when the connecting shaft 20 is fixed to the first mounting portion 40, the position of the telescopic rod 31 corresponds to the position of the locating hole 21, so that the telescopic rod 31 can extend into the corresponding locating hole 21 in the extended state.

The fourth mounting portion 70 is fixedly provided with a fixing plate 80, the fixing plate 80 is disposed in the notch 711 of the mounting groove 71. The fixing plate 80 covers the notch 711 and holds against the limiting member 30 to fix the limiting member 30 in the mounting groove 71.

Figure 7:
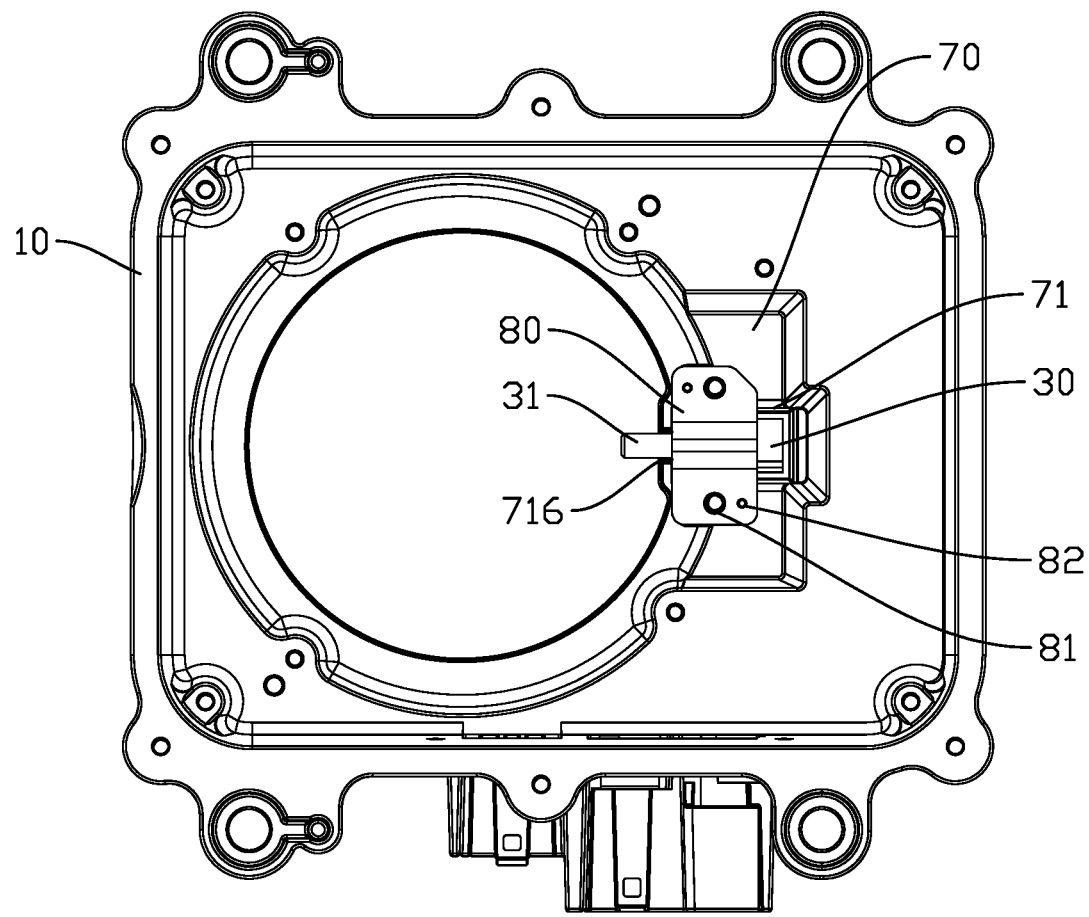
FIG. 7 is a top view illustrating the rotating base, a limiting member, and a fixing plate according to an embodiment of the present disclosure.

Referring to FIGS. 6 and 7, the first groove wall 712 is fixedly provided with a locating block 717, and the locating block 717 and the second groove wall 713 hold against opposite sides of the limiting member 30, respectively. The locating block 717 is held against one side of the limiting member 30 equipped with the telescopic rod 31, and the second groove wall 713 is held against one side of the limiting member 30 away from the telescopic rod 31, to locate the limiting member 30.

In one embodiment, the third groove wall 714 and the fourth groove wall 715 are respectively held against opposite sides of the limiting member 30.

The locating block 717, the second groove wall 713, the third groove wall 714, and the fourth groove wall 715 cooperate with each other to locate the limiting member 30, thereby reducing the risk of positional shift of the limiting member 30 during operation and improving the working stability of the limiting member 30.

Referring to FIGS. 5 and 7, the connecting port 716 is communicated with the notch 711, and there is a spacing distance between the locating block 717 and the notch 711. Specifically, the number of the locating blocks 717 is 2, and both the locating blocks 717 are disposed on one side of the first groove wall 712 proximate to the bottom of the groove of the mounting groove 71.

When installing the limiting member 30, the telescopic rod 31 can first be extended from the notch 711 into the connecting port 716, and then the limiting member 30 can be inserted into the mounting groove 71.

A certain space is leaved between the locating block 717 and the notch 711, thereby reducing the risk of positional interference between the limiting member 30 and the locating block 717 during installation, facilitating the installation and fixing of the limiting member 30, and improving the installation efficiency.

In one embodiment, the second groove wall 713 is provided at an incline, and the distance between the first groove wall 712 and the second groove wall 713 gradually increases toward proximity to the notch 711.

The present disclosure utilizes the inclined setting of the second groove wall 713 to increase the size of the notch 711 of the mounting groove 71, so as to facilitate the entry of the limiting member 30 into the mounting groove 71, which facilitates the mounting and fixing of the limiting member 30 and improves the installation efficiency.

In one embodiment, the third groove wall 714 and the fourth groove wall 715 are provided at an incline, and the distance between the third groove wall 714 and the fourth groove wall 715 gradually increases toward proximity to the notch 711.

The present disclosure utilizes the inclined setting of the third groove wall 714 and the fourth groove wall 715 to increase the size of the notch 711 of the mounting groove 71, so as to facilitate the entry of the limiting member 30 into the mounting groove 71, which facilitates the mounting and fixing of the limiting member 30 and improves the installation efficiency.

Referring to FIGS. 6 and 7, in one embodiment of the present disclosure, the fixing plate 80 is removably connected to the fourth mounting portion 70 to facilitate later removal of the limiting member 30 from the rotating base 10 for repair or replacement.

In one embodiment, the fixing plate 80 is bolted and secured to the rotating base 10 by mounting screws (not shown in the figure).

The length of the fixing plate 80 is greater than the width of the groove of the mounting groove 71, so that the ends of the fixing plate 80 can be attached to the fourth mounting portion 70. The fixing holes 81 are provided at each end of the fixing plate 80, and the fixing holes 81 pass through the fixing plate 80. The fourth mounting portion 70 defines a plurality of threaded holes 73, the plurality of the threaded holes 73 corresponding one to the plurality of the fixing holes 81, and the plurality of the threaded holes 73 are connected to the corresponding fixing holes 81.

The mounting screws are threaded through the fixing holes 81 and threaded into the threaded holes 73, so that the ends of the fixing plate 80 is held against the fourth mounting portion 70 and the fixing plate 80 holds against the limiting member 30, so that the fixing plate 80, the limiting member 30, and the rotating base 10 are fixed relative to each other.

In one embodiment, the fixing plate 80 defines a plurality of limiting holes 82 at each end of the fixing plate 80, the limiting hole 82 passes through the fixing plate 80. The fourth mounting portion 70 is provided with a plurality of limiting blocks 74, the plurality of the limiting blocks 74 corresponding to the plurality of the plurality of the limiting holes 82. The plurality of the limiting blocks 74 are inserted in corresponding limiting holes 82 to limit the fixing plate 80, thereby preventing the position of the fixing plate 80 from deviating, facilitating the installation of the fixing plate 80, and improving the stability of the installation of the fixing plate 80 and the limiting member 30.

Referring to FIGS. 1 and 3, the embodiments of the present disclosure further provide a vehicle-mounted rotating screen 200, the vehicle-mounted rotating screen 200 includes the display screen 300, the driving device 400, and the screen bracket 100. The display screen 300 is fixedly connected to the connecting shaft 20 so that the display screen 300 rotates synchronously with the connecting shaft 20. The driving device 400 is disposed in the rotating base 10, and the driving device 400 is connected to the connecting shaft 20.

The driving device 400 includes a rotation motor and a gear transmission structure, and an output shaft of the rotation motor is connected to the connecting shaft 20 through the gear transmission structure, so that the rotation motor can drive the connecting shaft 20 to rotate and realize the rotation of the display screen 300.

The implementation principles and beneficial effects of the vehicle-mounted rotating screen 200 provided by the embodiments of the present disclosure can be referred to the relevant descriptions of the screen bracket 100 in the preceding embodiments, and the present disclosure will not repeat them herein.

Those of ordinary skill in the art should realize that the above embodiments are only used to illustrate the present disclosure, but not to limit the present disclosure. As long as they are within the essential spirit of the present disclosure, the above embodiments are appropriately made and changes fall within the scope of protection of the present disclosure.

What is claimed is:

1. A screen bracket comprising:
    a rotating base;
    a connecting shaft, a first end of the connecting shaft connected to a display screen, a second end of the connecting shaft rotatably connected to the rotating base, wherein the second end of the connecting shaft defines a plurality of locating holes, and the plurality of locating holes is spaced around circumference of the connecting shaft; and
    a limiting member fixed to the rotating base, wherein the limiting member has a telescopic rod, and the telescopic rod is disposed towards the connecting shaft,
    wherein the plurality of locating holes corresponds to different rotation angles, when the connecting shaft rotates to a specified rotation angle, a corresponding locating hole is facing the telescopic rod, and the telescopic rod is configured to clamp the corresponding locating hole in an extended state and detach the corresponding locating hole in a retracted state.

2. The screen bracket of claim 1, wherein the limiting member is an electromagnetic valve, and a valve needle of the electromagnetic valve is the telescopic rod.

3. The screen bracket of claim 1, wherein the rotating base defines a mounting groove, the limiting member is disposed in the mounting groove, a first groove wall of the mounting groove facing the connecting shaft is equipped with a connection port, and the telescopic rod is threaded through the connection port.

4. The screen bracket of claim 3, wherein the rotating base is equipped with a fixing plate, the fixing plate is disposed at a notch of the mounting groove, and the fixing plate is held against the limiting member to fix the limiting member in the mounting groove.

5. The screen bracket of claim 4, wherein the mounting groove comprises a second groove wall, the first groove wall and the second groove wall are disposed relative to each other, and the first groove wall is provided with a locating block, the locating block and the second groove wall are respectively held against opposite sides of the limiting member.

6. The screen bracket of claim 4, wherein the mounting groove comprises a third groove wall and a fourth groove wall, and the third groove wall and the fourth groove wall are relatively disposed to each other, and the third groove wall and the fourth groove wall are respectively held against opposite sides of the limiting member.

7. The screen bracket of claim 4, wherein the fixing plate is bolted to the rotating base.

8. The screen bracket of claim 7, wherein the rotating base is equipped with a limiting block, the fixing plate is equipped with a limiting hole, and the limiting block is clamped with the limiting hole to limit the fixing plate.

9. A vehicle-mounted rotating screen comprising:
    a display screen;
    a driving device; and
    a screen bracket comprising:
        a rotating base;
        a connecting shaft, a first end of the connecting shaft connected to the display screen, a second end of the connecting shaft rotatably connected to the rotating base, wherein the second end of the connecting shaft defines a plurality of locating holes, and the plurality of locating holes is spaced around circumference of the connecting shaft; and
        a limiting member fixed to the rotating base, wherein the limiting member has a telescopic rod, and the telescopic rod is disposed towards the connecting shaft,
    wherein the plurality of locating holes correspond to different rotation angles, when the connecting shaft rotates to a specified rotation angle, a corresponding locating hole is facing the telescopic rod, and the telescopic rod is configured to clamp the corresponding locating hole in an extended state and detach the corresponding locating hole in a retracted state, and
    wherein the display screen is connected to the connecting shaft, the driving device is disposed on the rotating base, and the driving device is connected to the connecting shaft.

10. The vehicle-mounted rotating screen of claim 9, wherein the limiting member is an electromagnetic valve, and a valve needle of the electromagnetic valve is the telescopic rod.

11. The vehicle-mounted rotating screen of claim 9, wherein the rotating base defines a mounting groove, the limiting member is disposed in the mounting groove, a first groove wall of the mounting groove facing the connecting shaft is equipped with a connection port, and the telescopic rod is threaded through the connection port.

12. The vehicle-mounted rotating screen of claim 11, wherein the rotating base is equipped with a fixing plate, the fixing plate is disposed at a notch of the mounting groove, and the fixing plate is held against the limiting member to fix the limiting member in the mounting groove.

13. The vehicle-mounted rotating screen of claim 12, wherein the mounting groove comprises a second groove wall, the first groove wall and the second groove wall are disposed relative to each other, the connecting port is disposed on the first groove wall, and the first groove wall is provided with a locating block, the locating block and the second groove wall are respectively held against opposite sides of the limiting member.

14. The vehicle-mounted rotating screen of claim 12, wherein the mounting groove comprises a third groove wall and a fourth groove wall, and the third groove wall and a fourth groove wall are relatively disposed to each other, and the third groove wall and the fourth groove wall are respectively held against opposite sides of the limiting member.

15. The vehicle-mounted rotating screen of claim 12, wherein the fixing plate is bolted to the rotating base.

16. The vehicle-mounted rotating screen of claim 15, wherein the rotating base is equipped with a limiting block, the fixing plate is equipped with a limiting hole, and the limiting block is clamped with the limiting hole to limit the fixing plate.

\* \* \* \* \*